(12) United States Patent
Dunn et al.

(10) Patent No.: US 9,427,745 B2
(45) Date of Patent: Aug. 30, 2016

(54) MATERIAL PROCESSING APPARATUS WITH MULTI-MODE FEED CONVEYOR ASSEMBLY

(71) Applicants: Gordon Dunn, Omagh (GB); Raymond Young, Omagh (GB); Martin McGirr, Sixmilecross (GB)

(72) Inventors: Gordon Dunn, Omagh (GB); Raymond Young, Omagh (GB); Martin McGirr, Sixmilecross (GB)

(73) Assignee: TEREX GB LIMITED, Dungannon, County Tyrone (GB)

( * ) Notice: Subject to any disclaimer, the term of this patent is extended or adjusted under 35 U.S.C. 154(b) by 115 days.

(21) Appl. No.: 14/176,300

(22) Filed: Feb. 10, 2014

(65) Prior Publication Data
US 2014/0224906 A1 Aug. 14, 2014

(30) Foreign Application Priority Data
Feb. 14, 2013 (GB) .................................. 1302576.2

(51) Int. Cl.
| | | |
|---|---|---|
| *B02C 23/02* | (2006.01) | |
| *B65G 47/46* | (2006.01) | |
| *B07B 1/00* | (2006.01) | |
| *B02C 21/02* | (2006.01) | |
| *B02C 23/08* | (2006.01) | |

(52) U.S. Cl.
CPC .............. *B02C 23/02* (2013.01); *B02C 21/026* (2013.01); *B02C 23/08* (2013.01); *B07B 1/005* (2013.01); *B65G 47/46* (2013.01)

(58) Field of Classification Search
CPC ..... B02C 23/02; B02C 23/08; B02C 21/026; B02C 21/02; B65G 47/46; B07B 1/005
USPC .............. 241/152.1, 152.2, 222, 223, 101.76
See application file for complete search history.

(56) References Cited

U.S. PATENT DOCUMENTS

| | | | | |
|---|---|---|---|---|
| 5,294,065 | A * | 3/1994 | Harms et al. ............ | 241/101.76 |
| 5,655,719 | A * | 8/1997 | Getz ....................... | B02C 21/02 241/101.76 |
| 5,878,967 | A * | 3/1999 | Conner ........................ | 241/79.1 |
| 7,182,284 | B2 * | 2/2007 | Jabs ........................ | B02C 21/02 241/101.74 |
| 7,588,204 | B2 * | 9/2009 | Douglas et al. .......... | 241/101.76 |
| 8,011,606 | B1 * | 9/2011 | Chrestenson .............. | 241/24.12 |
| 2008/0041984 | A1* | 2/2008 | Sauser et al. ................... | 241/75 |
| 2011/0089270 | A1* | 4/2011 | Juha et al. ....................... | 241/25 |
| 2013/0126648 | A1* | 5/2013 | Robinson .............. | B02C 21/026 241/81 |

FOREIGN PATENT DOCUMENTS

| | | |
|---|---|---|
| DE | 1607502 A1 | 9/1969 |
| DE | 3228735 A1 | 2/1984 |
| DE | 3637289 A1 | 5/1988 |
| DE | 3834381 A1 | 4/1990 |
| WO | 2008129287 A2 | 10/2008 |

* cited by examiner

*Primary Examiner* — Faye Francis
*Assistant Examiner* — Onekki Jolly
(74) *Attorney, Agent, or Firm* — Burns & Levinson LLP; John C. Serio; Marlo Schepper Grolnic

(57) ABSTRACT

A material processing apparatus comprising: a base; a first material processing unit, for example a crusher and; a feed conveyor. The feed conveyor and the second material processing unit are both movable with respect to the first material processing unit and with respect to each other so that material can be fed into the first material processing unit directly from the feed coneyor, or indirectly from the feed conveyor via the second material processing unit. The second material processing unit can be stored beneath the feed conveyor when not in use.

23 Claims, 5 Drawing Sheets

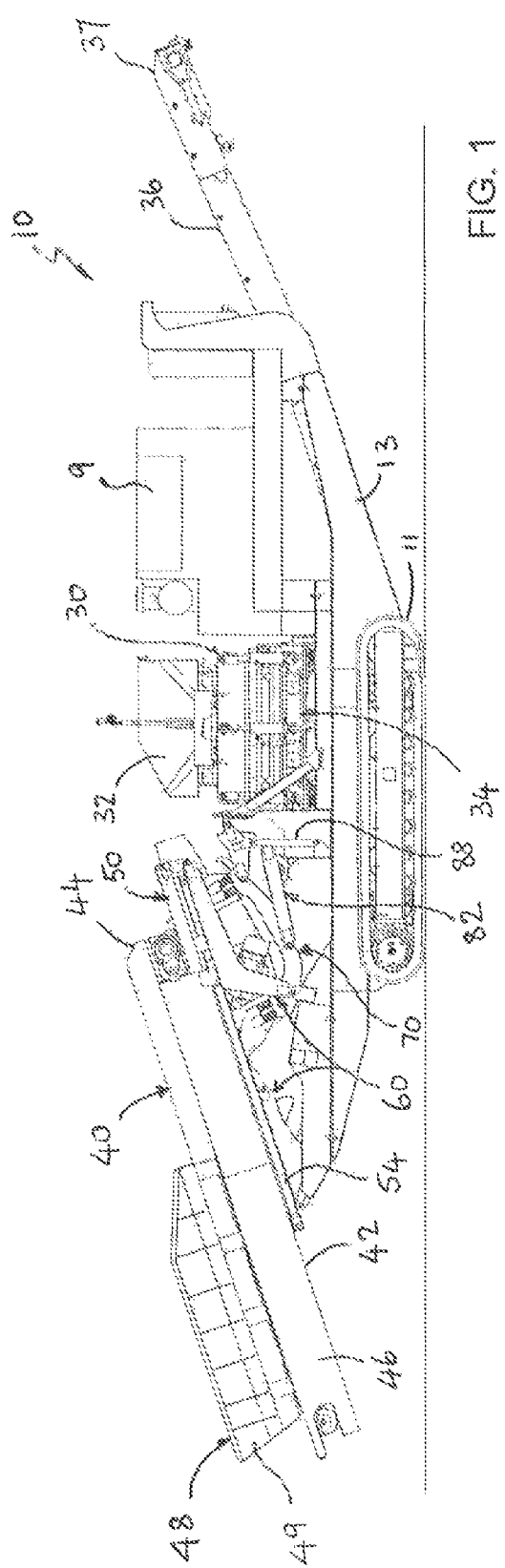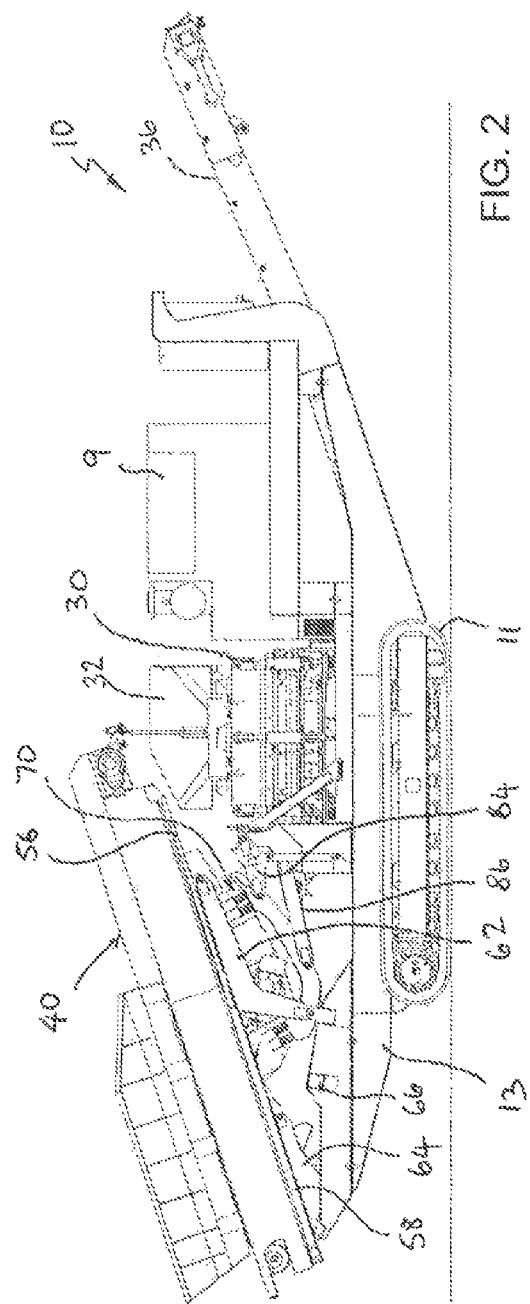

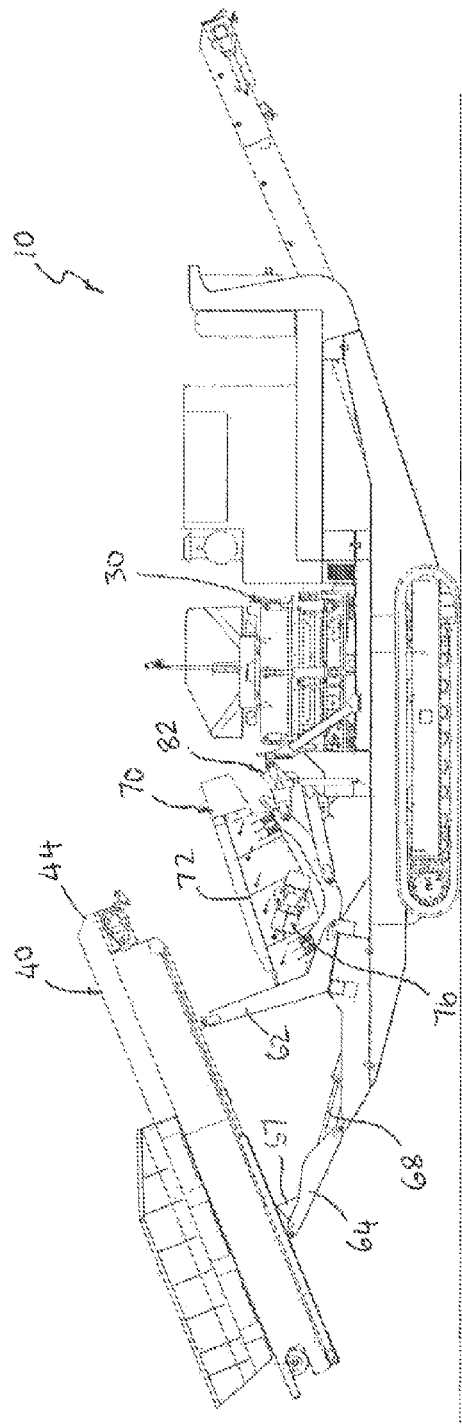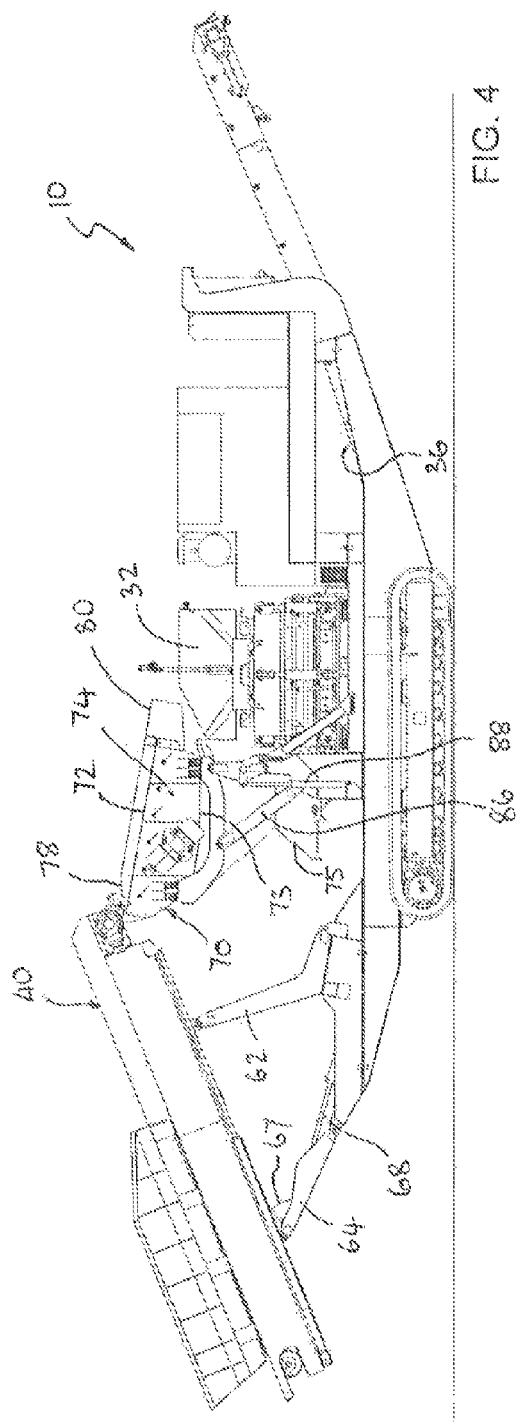

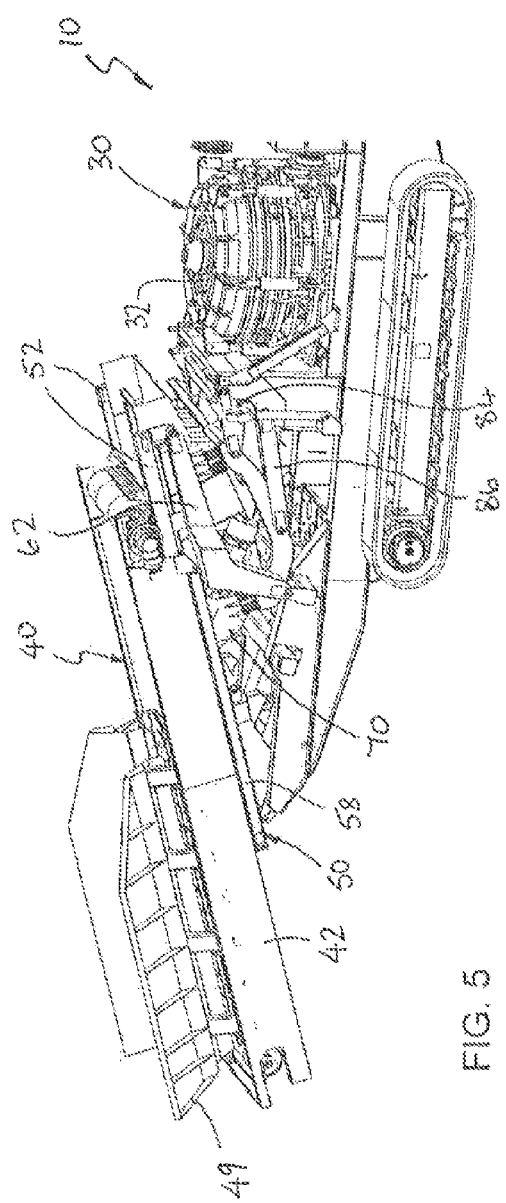

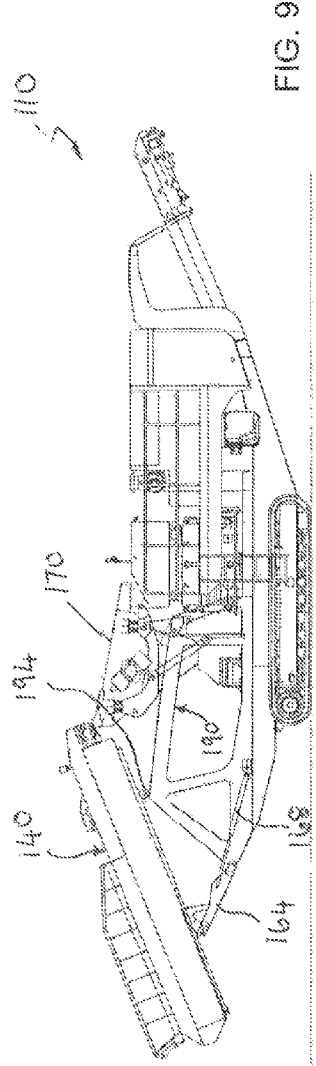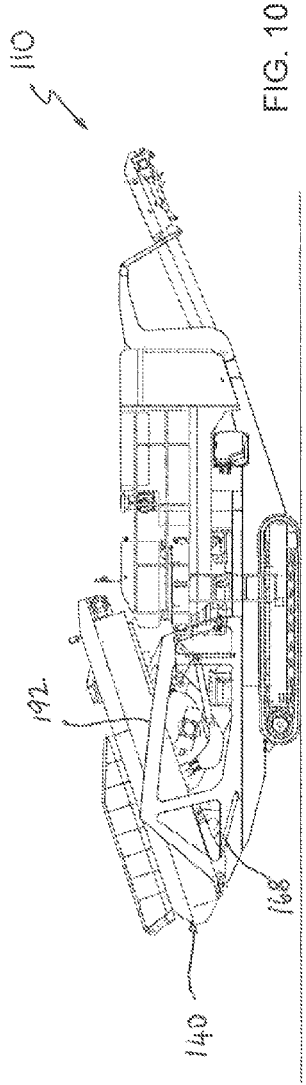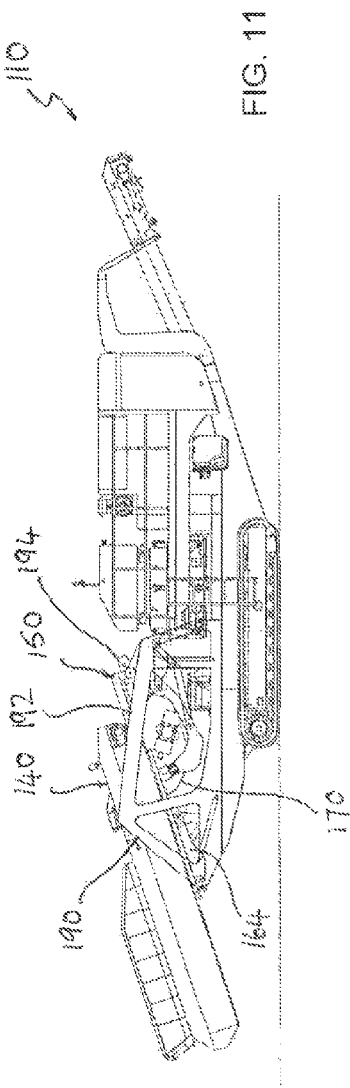

MATERIAL PROCESSING APPARATUS WITH MULTI-MODE FEED CONVEYOR ASSEMBLY

CROSS-REFERENCE TO RELATED APPLICATIONS

This application claims priority to Application No. 1302576.2, filed on 14 Feb. 2013 in the United Kingdom, the contents of which are hereby incorporated by reference in their entirety for all purposes.

FIELD OF THE INVENTION

The present invention relates to feed conveyors and feed conveyor assemblies for material processing apparatus, particularly aggregate processing apparatus. The invention relates particularly but not exclusively to feed and pre-screening assemblies for material crushing apparatus.

BACKGROUND TO THE INVENTION

International PCT patent application WO 2008/129287 discloses a crushing machine with a feed conveyor that is movable to accommodate normal and bypass feeding modes as well as a transport mode. One disadvantage with this machine is an inefficient use of space having the effect of increasing the overall size of the machine.

It would be desirable to provide an improved material processing apparatus.

SUMMARY OF THE INVENTION

A material processing apparatus comprising: a base; a first material processing unit mounted on the base; a feed conveyor movable between a first state in which the feed conveyor is positioned to feed material to said first processing unit, and a second state in which the feed conveyor is retracted from said first processing unit relative to said first state; and a second material processing unit mounted on the base and movable between a deployed state and a stowed state, wherein when said feed conveyor is in said second state and said second material processing unit is in said deployed state, said feed conveyor is positioned to feed material to said second material processing unit, and wherein when said feed conveyor is in said first state and said second material processing unit is in said stowed state, said second material processing unit is located beneath said feed conveyor.

In typical embodiments, when said second material processing apparatus is in said deployed state it is positioned to feed material to said first material processing apparatus.

The apparatus may include a feed conveyor assembly comprising said feed conveyor and a support structure for the feed conveyor, said feed conveyor assembly being movable between said first and second states and wherein said feed conveyor is movable with respect to said support structure between an advanced state and a retracted state. The feed conveyor is for example movable between said advanced and retracted states along an axis aligned with the feed direction of said feed conveyor.

Typically, when said feed conveyor assembly is in said first state, the feed conveyor is positioned to feed material to said first processing unit when in said advanced state. Also typically, when said feed conveyor assembly is in said second state, the feed conveyor is positioned to feed material to said second processing unit when in said advanced state.

In preferred embodiments, said first material processing unit comprises a crusher and said second material processing unit comprises a screening apparatus.

Other preferred features are recited in the dependent claims.

From another aspect the invention provides a material processing apparatus comprising: a base; a first material processing unit, for example a crusher; a feed conveyor; and a second material processing unit, for example a screening unit, the feed conveyor and the second material processing unit both being movable with respect to the first material processing unit and with respect to each other so that material can be fed into the first material processing unit directly from the feed conveyor, or indirectly from the feed conveyor via the second material processing unit. The second material processing unit can be stored beneath the feed conveyor when not in use.

Further advantageous aspects of the invention will become apparent to those ordinarily skilled in the art upon review of the following description of a preferred embodiment and with reference to the accompanying drawings.

BRIEF DESCRIPTION OF THE DRAWINGS

An embodiment of the invention is now described by way of example and with reference to the accompanying drawings in which like numerals are used to denote like parts and in which:

FIG. 1 is a side view of a material processing apparatus embodying the invention, the apparatus including a feed assembly shown in a transport mode;

FIG. 2 is a side view of the apparatus of FIG. 1 with the feed assembly shown in a direct feed mode;

FIG. 3 is a side view of the apparatus of FIG. 1 with the feed assembly shown in transition between modes;

FIG. 4 is a side view of the apparatus of FIG. 1 with the feed assembly shown in a pre-screening mode;

FIG. 5 is a perspective view of part of the apparatus of FIG. 1, showing the feed assembly in the transport mode;

FIG. 6 is a perspective view of part of the apparatus of FIG. 1, showing the feed assembly in the direct feed mode;

FIG. 9 is a side view of an alternative material processing apparatus embodying the invention, the apparatus including a feed assembly shown in a pre-screening mode;

FIG. 10 is a side view of the apparatus of FIG. 9, showing the feed assembly in the direct feed mode; and FIG. 11 is a side view of the apparatus of FIG. 9, showing the feed assembly in the transport mode.

DETAILED DESCRIPTION OF THE DRAWINGS

Figure 7:
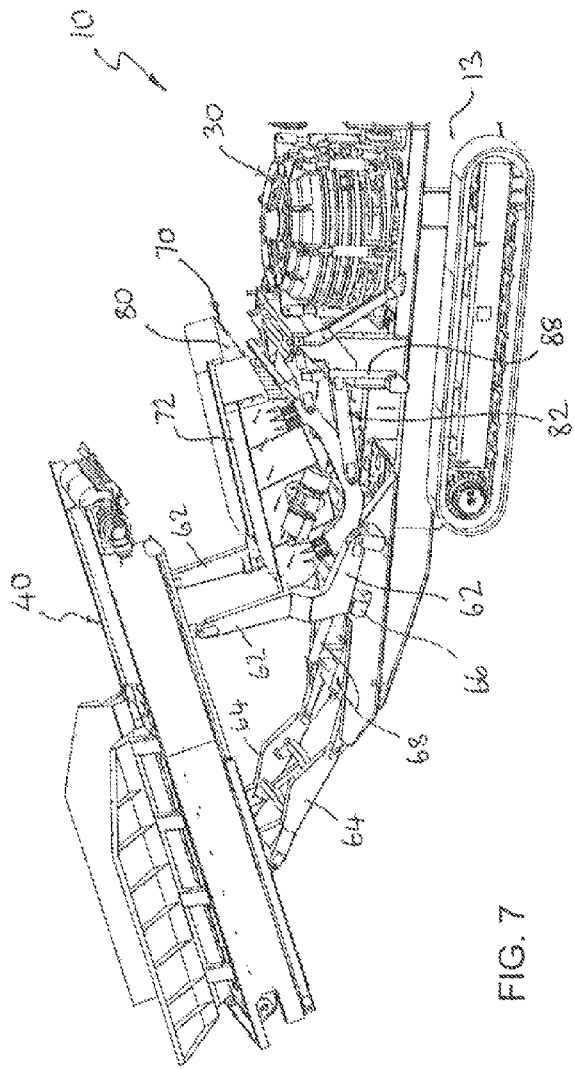
FIG. 7 is a perspective view of part of the apparatus of FIG. 1, showing the feed assembly in transition between modes.

Referring now to the drawings, there is shown, generally indicated as 10, a material processing apparatus, The illustrated material processing apparatus 10 is configured primarily for performing material crushing and may be referred to as a material crushing apparatus, In alternative embodiments, the apparatus may be configured to perform any one or more of a plurality of processes, such as feeding, screening, separating, crushing, waste recycling or demolition and/or washing, on one or more types of aggregate or other material, for example rocks, stones, gravel, sand and/or soil, or any other material that is quarried, mined or excavated. To this end, the apparatus may include one or more material processing units adapted to perform one or more of the foregoing processes.

In typical embodiments, the apparatus 10 is mobile and comprises one or more wheels and/or tracks 11 mounted on a chassis 13. The apparatus 10 may be self-propelled and to this end may comprise a drive system (not shown), e.g. comprising an engine or electrical power plant, for driving the wheels/tracks 11. In any event, the apparatus 10 may include a power plant 9, which may comprise at least some components of the drive system and/or other apparatus for powering the apparatus, e.g. electrical, hydraulic and/or pneumatic apparatus for powering rams or other devices, and may also include a control unit (not shown). The control unit is configured for controlling the apparatus, including causing the apparatus 10 to adopt the modes described hereinafter, and may include manually operable controls and/or be adapted to allow remote control by an operator.

The apparatus 10 comprises a first material processing unit in the form of a crusher 30 which may take any suitable conventional form, for example a cone crusher. The crusher 30 has an inlet 32, typically comprising a feed box, at its top and an outlet 34 at its bottom, A feed conveyor 40 is provided for, in a direct feed mode, feeding material into the inlet 32. A main conveyor 36 is aligned with the outlet 34 of crusher 30 to receive crushed material therefrom. The main conveyor 36 is typically configured to discharge material from the apparatus 10, and in the illustrated example has a discharging end 37 projecting from an end of the apparatus (the front of the apparatus in this example). In alternative embodiments, more than one conveyor may be provided for receiving material from the crusher 30 and discharging it from the apparatus 10.

In the illustrated embodiment, the crusher 30, power plant 9, feed conveyor 40 and main conveyor 36 are mounted on the chassis 13, but may be mounted on an alternative base structure in embodiments where the apparatus 10 is not mobile.

The feed conveyor 40 comprises a frame 42 adapted to support conveying means, typically comprising a powered conveyor belt (not shown). The conveyor 40 has a discharge end 44 and a feed end 46, and may also comprise a hopper structure 48 arranged to receive material and guide it onto the conveyor 40. The illustrated hopper structure 48 comprises a respective flare 49 on each side of the frame 42, but may take other forms.

The feed conveyor 40 is slidably mounted on a conveyor support structure 50 and is capable of sliding back and forth with respect to the structure 50 along an axis that runs from end to end 44, 46, of the conveyor 40, i.e. its longitudinal axis in typical embodiments. The axis typically also coincides with the direction in which the conveyor 40 conveys material from end to end 44, 46. Any suitable slidable coupling may be provided between the conveyor 40 and the support structure 50. For example, in the illustrated embodiment, a respective rail 52 is provided on each side of the support structure 50 running along the sliding axis, the conveyor frame 42 carrying a respective one or more rollers (not visible) running in a respective one of the rails 52. It will be apparent that any other convenient sliding mechanism(s) may alternatively be used.

The feed conveyor 40 is slidable between an advanced state, in which it adopts a relatively advanced position with respect to the crusher 30 (or other material processing unit with which the conveyor 40 may be co-operable in alternative embodiments), and a retracted state, in which it adopts a relatively retracted position with respect to the crusher 30 (or other material processing unit with which the conveyor 40 may be co-operable in alternative embodiments).

One or more powered actuators, conveniently one or more rams 54 or other linear actuators, are provided for effecting sliding movement of the feed conveyor 40. In the illustrated embodiment, a ram 54 is coupled between the conveyor 40 and the support structure 50 and is configured to cause the conveyor 40 to slide back and forth as the ram 54 extends and retracts. In the drawings, the piston rod 56 is coupled to the conveyor 40 and the housing 58 is coupled to the support structure 50, although an opposite arrangement may be effected. In either case, the actuator is conveniently aligned with the sliding axis. A corresponding actuator (not shown) may be provided on the opposite side of the conveyor 40.

The feed conveyor 40 and the conveyor support structure 50 may together be referred to as a feed conveyor assembly 40, 50. The feed conveyor assembly 40, 50 is movable with respect to the chassis 13 between a first state (shown in FIGS. 1, 2, 5 and 6) a second state (shown in FIGS. 3, 4, 7 and 8). In the illustrated embodiment, the feed conveyor assembly 40, 50 is coupled to the chassis 13 by a pivotable linkage mechanism 60 configured to allow the assembly 40, 50 to move between the first state the second state. In the first state, the assembly 40, 50 assumes a relatively lowered position with respect to the chassis 13, and a relatively advanced position with respect to the crusher 30 (or other material processing unit with which the assembly 40, 50 may be co-operable in alternative embodiments). In the second state, the assembly 40, 50 assumes a relatively raised position with respect to the chassis 13, and a relatively retracted position with respect to the crusher 30 (or other material processing unit with which the assembly 40, 50 may be co-operable in alternative embodiments).

The linkage mechanism 60 comprises at least one link pivotably coupled between the assembly 40, 50 and the chassis 13. The illustrated embodiment shows the linkage mechanism 60 connected to the support structure 50, although it may alternatively be connected to the conveyor 40. In the illustrated embodiment, there are first and second links 62, 64 spaced apart longitudinally of the conveyor 40, the first link 62 being closer to the discharge end 44 of the conveyor 40 and the second link 64 being closer to the feed end 46. The links 62, 64 may be configured any convenient manner to incline the conveyor 40 in the first and second states such that the discharge end 44 is above the feed end 46. In the illustrated embodiment, each link 62, 64 comprises a respective pair of spaced-apart link members, the respective link members of each pair preferably being connected together by one or more crosspiece to form a respective frame. Typically, one or more stops are provided to limit the movement of the linkage mechanism 60 in one or both directions and so to define the position of the assembly 40, 50 in one or both of the first and second states. For example, and as can best be seen from FIGS. 7 and 8, a stop member 66 is provided in the path of the link 62 to define the position of the assembly 40, 50 in the second state. To facilitate this, the link 62 conveniently includes an elbow portion, or other stop-engaging portion, for engaging with the stop 66. Referring in particular to FIGS. 3 and 4, one or more stop members 67 may be provided on the or each link 64 and configured for engagement with the assembly 40, 50 in the deployed state.

Alternatively or in addition, the position of the assembly 40, 50 in the first and/or second states may be determined by the relative extension/retraction of one or more actuators and/or by engagement of the assembly 40, 50 with the chassis 13 or one or more components mounted on the chassis 13.

One or more powered actuators, conveniently one or more rams 68 or other linear actuators, are provided for effecting movement of the assembly 40, 50 between the first and second states, In the illustrated embodiment, rams 68 are coupled between the chassis 13 and the second link 64, but in other embodiments, one or more actuators may alternatively or additionally be coupled between the chassis 13 and the linkage mechanism 60 or the assembly 40, 50. In the illustrated embodiment, the rams 68 have one end pivotably coupled to the chassis 13 and the other end pivotably coupled directly to the link 64. Alternatively, one or more intermediate link members (not shown) may be provided between the rams 68 (or other actuators) and the link 64 and be pivotably coupled to each. For example, the or each intermediate link member may be substantially V shaped, having its apex pivotably coupled to one or more of the rams 68 and its free ends pivotably coupled to the link 64. This arrangement advantageously increases the distance between the point at which the link 64 is coupled to the chassis 13 and the end of the rams 68 (in comparison to cases where the ends of the rams 68 are connected directly to the link 64) and so reduces the amount of work the rams 68 are required to do.

When the assembly 40, 50 is in the first state, and when the feed conveyor 40 is in its advanced state, the discharge end 44 of the feed conveyor 40 is positioned over or otherwise aligned with the inlet 32 of the crusher 30 (or other material processing unit with which the conveyor 40 may be co-operable in alternative embodiments) such that material discharged from the end 44 falls into the inlet 32. This configuration corresponds to a direct feed mode of the apparatus 10 and is illustrated in FIGS. 2 and 6.

As can best be seen from FIGS. 1 and 5, when the assembly 40, 50 is in the first state, and when the feed conveyor 40 is in its retracted state, the conveyor 40 and in particular its discharge end 44 is relatively low (e.g. in comparison with the direct feed mode of FIG. 2). This facilitates transporting of the apparatus 10, e.g. on a trailer (not shown), since it reduces the overall height of the apparatus 10. The configuration of FIGS. 1 and 5 may therefore be referred to as a transport mode.

In preferred embodiments, the apparatus 10 includes a second material processing unit typically comprising a screening unit 70. The screening unit 70 comprises a screen 72, which typically comprises one or more mesh or apertured screening layers, carried by a frame 74. The screen 72 is configured to allow only material that is smaller than a particular size (which may vary depending on the application) to pass through the screen 72. The screen 72 is preferably removable so that screens with suitably sized apertures may be selected for a given application.

The screening unit 70 has an outlet 73, typically below the screen 72, by which material that passes through the screen 72 is output from the unit 70. Usually, the screening unit 70 includes drive means 76 coupled to the screen 70 to impart motion, typically vibratory and/or oscillatory motion, to the screen 72 to assist the screening action.

The screening unit 70 has a feed end 78 and a discharge end 80. When deployed (FIGS. 4 and 8), the preferred configuration of the unit 70 is such that the screen 72 is inclined with the discharge end 80 being below the feed end 78. This arrangement, advantageously in combination with the motion imparted by the drive means 76, helps to cause material that has not passed through the screen 72 to pass along the screen 72 and be discharged via the discharge end 80. In alternative embodiments, the screen may adopt other dispositions when deployed and may, for example, be parallely or substantially parallely disposed with respect to the chassis when deployed (i.e. horizontal or substantially horizontal as view in FIGS. 1 to 4).

When the screening unit 70 is deployed, the outlet 73 is aligned with a conveyor and/or a chute 75 aligned with a conveyor, for example the same conveyor with which the outlet of the crusher 30 is aligned, or other destination as applicable. In the illustrated embodiment, chute 75 is arranged to direct material from the outlet 73 of the screening unit 72 onto the main conveyor 36.

The screening unit 70 movable with respect to the chassis 13 between a deployed state (shown in FIGS. 4 and 8) a stowed state (shown in FIGS. 1, 3, 5, 6 and 7). In the illustrated embodiment, the screening unit 70 is coupled to the chassis 13 by a pivotable linkage mechanism 82 configured to allow the unit 70 to move between the deployed and stowed states. In the deployed state, the unit 70 assumes a relatively raised position with respect to the chassis 13, and a relatively advanced position with respect to the crusher 30 (or other material processing unit with which the assembly 40, 50 may be co-operable in alternative embodiments). In particular, in the deployed state, the unit 70 is adjacent the crusher 30 with its discharge end 80 aligned with, and typically above, the inlet 32 of the crusher 30 such that material discharged from end 80 falls into the inlet 32. In the stowed state, the unit 70 assumes a relatively lowered position with respect to the chassis 13, and a relatively retracted position with respect to the crusher 30 (or other material processing unit with which the assembly 40, 50 may be co-operable in alternative embodiments).

The linkage mechanism 82 comprises at least one link pivotably coupled between the screening unit 70 and the chassis 13. In the illustrated embodiment, there are first and second links 84, 86 spaced apart longitudinally (i.e. in the end-to-end direction) of the screen, the first link 84 being closer to the discharge end 80 of the unit 70 and the second link 86 being closer to the feed end 78. The links 84, 86 may be configured any convenient manner to cause the screen 72 to be inclined in the deployed state such that the discharge end 80 is below the feed end 78, although in alternative embodiments the screen need not be inclined with respect to the chassis when deployed, it may instead be disposed parallely or substantially parallely with the chassis when deployed. The linkage mechanism may be configured in any convenient manner to hold the screen in the desired disposition when deployed. In the illustrated embodiment, each link 84, 86 comprises a respective pair of spaced-apart link members, One or more stops (not shown) may be provided to limit the movement of the linkage mechanism 82 in one or both directions and so to define the position of the unit 70 in the stowed and/or deployed states, Alternatively or in addition, the position of the unit 70 in the stowed and/or deployed states may be determined by the relative extension/retraction of one or more actuators and/or by engagement of the unit 70 with the chassis 13 or one or more components mounted on the chassis 13.

One or more powered actuators, conveniently one or more rams 88 or other linear actuators, are provided for effecting movement of the screening unit 70 between the deployed and stowed states, In the illustrated embodiment, rams 88 are coupled between the chassis 13 and the first link 84, but in other embodiments, one or more actuators may alternatively or additionally be coupled between the chassis 13 and the linkage mechanism 82 or the screening unit 70.

As can be seen from FIGS. 1, 2, 5 and 6, when the screening unit 70 is in its stowed state, it fits beneath the feed conveyor assembly 40, 50 when in its first state. In particular the screening unit 70 is beneath the support structure 50 and does not impede movement of the feed conveyor 40 between its advanced and retracted states, Hence, in the transport and direct feed modes the screening unit 70 is stowed beneath the feed conveyor assembly 40, 50. Advantageously, the arrangement is such that the screening unit 70 does not project beyond the feed conveyor assembly 40, 50 in a longitudinal direction (left or right as viewed in FIGS. 1 and 2) and, as such does not contribute to the length of the apparatus 10 when stowed.

In order to deploy the screening unit 70 from its stowed state, the feed conveyor assembly 40, 50 is first caused to adopt its second state such that it is raised with respect to the chassis 13 to allow the screening unit 70 to be raised from its stowed state. This is illustrated in FIG. 3 which shows a transitionary configuration between the transport or direct feed modes and a pre-screening mode, which is now described.

Figure 8:
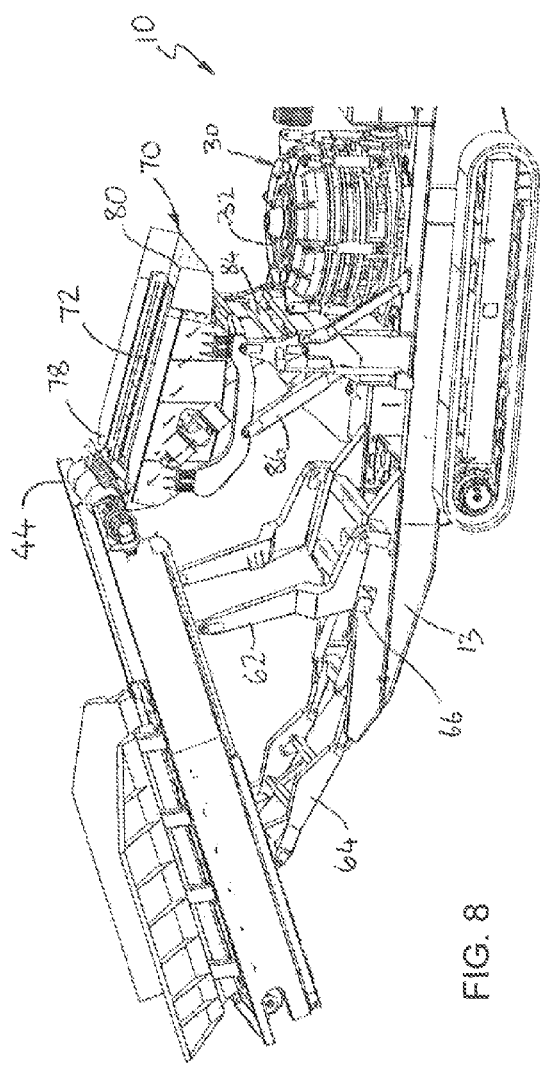
FIG. 8 is a perspective view of part of the apparatus of FIG. 1, showing the feed assembly in the pre-screening mode.

When the screening unit 70 is deployed, it is located between the feed conveyor assembly 40, 50 and the crusher 30 (or other material processing unit with which the assembly 40, 50 may be co-operable in alternative embodiments). When the feed conveyor 40 is in its advanced state, its discharge end 44 is aligned with the feed end 78 of the screening unit 70 and positioned such that material can be fed from the conveyor 40 onto the screen 72 (FIGS. 4 and 8). This configuration corresponds to the pre-screening mode. In the pre-screening mode, material discharged from the feed conveyor 40 is screened by the screening unit 70 before it can reach the crusher 30. In the illustrated embodiment, material that passes through the screen 72 is directed to the main conveyor 36 (although in alternative embodiments it may be directed to some other destination, e.g. a side conveyor) via the chute 75 and so bypasses the crusher 30. Material that does not pass through the screen 72 is discharged from end 80 of the screening unit 70 and fed into the crusher 30. Hence, the screening unit 70 can reduce the quantity of material that is fed to the crusher 30 thereby improving the efficiency of the apparatus 10.

In preferred embodiments, the feed conveyor 40 adopts its advanced state prior to deployment of the screening unit 70, this facilitates a preferred configuration of the apparatus 10 whereby the discharge end 44 of the feed conveyor 40 overlaps (in the longitudinal direction) with the feed end 78 of the screening unit 70 in the pre-screening mode, and wherein the proximity of the discharge end 44 and feed end 78 in this mode is such that, the feed end 78 lies in the path of the discharge end 44 as the conveyor 40 travels from the retracted state to the advanced state, For the same reason, the screening unit 70 is stowed, or at least moved out of the deployed state, prior to retracting the feed conveyor 40.

Respective movements of the feed conveyor assembly 40, 50, the conveyor 40 itself, and the screening unit 70 are conveniently controlled by an operator using one or more controls, e.g. provided on the control unit, or provided on a remote control unit, Advantageously, respective sequences of movements of the feed conveyor assembly 40, 50, the conveyor 40 itself, and the screening unit 70 may be automated to allow the operator to initiate mode-to-mode reconfigurations of the apparatus 10.

It will be apparent that, in preferred embodiments, the apparatus 10 is re-configurable to operate in any one of multiple operating modes (direct feed and pre-screening modes in this example). When not in use, the screening unit 70 is stowed such that it fits beneath the feed conveyor assembly and does not contribute to the length, or preferably the height, of the apparatus 10. The feed conveyor 40 is movable to a relatively lowered position in order to reduce the height of the apparatus 10 to facilitate transport.

In alternative embodiments, the support structure 50 may be omitted and, as can be appreciated from FIGS. 2, 3 and 4, the feed conveyor 40 may still be configurable to adopt the direct feed or pre-screening modes even when not slidable.

Referring now in particular to FIGS. 9 to 11 of the drawings, there is shown an alternative material processing apparatus 110 embodying the invention, The apparatus 110 is similar to the apparatus 10 (unless hereinafter indicated otherwise), like numerals being used to denote like parts and the same or similar description applying as would be apparent to a skilled person.

The feed conveyor assembly 140, 150 is mounted on the apparatus 110 by means of a linkage mechanism and an assembly support structure 190. In this example, the linkage mechanism comprises a link 164, which conveniently corresponds to the second link 64 of the apparatus 10 but no link corresponding to the first link 62. The support provided to the assembly 140, 150 by the support structure 190 replaces the support provided by link 62 in FIGS. 1 to 8, The support structure 190, which conveniently comprises a frame, includes a track 192. The track 192 is may be straight and/or curved as required and may extend along any suitable part, e.g. bar or beam, of the support structure 190. The track 192 is configured, e.g. shaped and dimensioned, to receive one or more running device 194, for example a wheel or roller, that is provided on the assembly 140, 150. The runner 194 moves back and forth in the track 192 as the assembly 140, 150 moves between respective states, e.g. the pre-screening state and the direct feed state, In the illustrated embodiment, as the link 164 is moved by rams 168 to effect movement of the assembly 140, 150, the runner 194 runs correspondingly back and forth along the track. This can be seen by comparison of FIGS. 9 and 10 which show, respectively, the feed assembly 140, 150 in its pre-screening and direct feed modes. FIG. 11 shows the assembly 140, 150 in the transport mode. The screening unit 170 may move from mode to mode in the manner described above in relation to FIGS. 1 to 8, as can be seen from FIGS. 9 to 11.

The invention is not limited to the embodiments described herein which may be modified or varied without departing from the scope of the invention.

What is claimed is:

1. A material processing apparatus comprising:
   a base;
   a first material processing unit mounted on the base;
   a feed conveyor movable longitudinally of said apparatus between a first state in which the feed conveyor is positioned to feed material to said first processing unit, and a second state in which the feed conveyor is retracted in a first longitudinal direction from said first processing unit relative to said first state, and raised with respect to said base relative to said first state; and
   a screening unit mounted on the base and movable between a deployed state and a stowed state in which said screening unit is retracted in said first longitudinal direction from said first processing unit relative to said deployed state and is lowered with respect to said base relative to said deployed state,
   wherein when said feed conveyor is in said second state and said screening unit is in said deployed state, said screening unit is located between, with respect to said direction, said feed conveyor and said first material processing unit, and said feed conveyor is positioned to feed material to said, screening unit, and said screening unit is positioned to feed material to said first processing unit, and wherein when said feed conveyor is in said first state and said screening unit is in said stowed state, said screening unit is located beneath said feed conveyor.

2. An apparatus as claimed in claim 1, including a feed conveyor assembly comprising said feed conveyor and a support structure for the feed conveyor, said feed conveyor assembly being movable between said first and second states and wherein said feed conveyor is movable with respect to said support structure between an advanced state and a retracted state.

3. An apparatus as claimed in claim 2, wherein said feed conveyor is movable between said advanced and retracted states along an axis aligned with the feed direction of said feed conveyor.

4. An apparatus as claimed in claim 2, wherein when said feed conveyor assembly is in said first state, the feed conveyor is positioned to feed material to said first processing unit when in said advanced state.

5. An apparatus as claimed in claim 2, wherein when said feed conveyor assembly is in said second state, the feed conveyor is positioned to feed material to said second processing unit when in said advanced state.

6. An apparatus as claimed in claim 2, wherein said feed conveyor has a feed end and a discharge end and is inclined such that said discharge end is above said feed end, and wherein said feed conveyor, in particular said discharge end, is lowered with respect to said base as said feed conveyor moves from said advanced state to said retracted state.

7. An apparatus as claimed in claim 2, wherein said feed conveyor has a feed end and a discharge end and is inclined such that said discharge end is above said feed end, and wherein when said feed conveyor is in said first state, a space is defined between said feed conveyor and said base for receiving said screening unit when in said stowed state.

8. An apparatus as claimed in claim 1, wherein in the first state, the feed conveyor adopts a relatively lowered position with respect to the base.

9. An apparatus as claimed in claim 8, including a feed conveyor assembly comprising said feed conveyor and a support structure for the feed conveyor, said feed conveyor assembly being movable between said first and second states and wherein said feed conveyor is movable with respect to said support structure between an advanced state and a retracted state, wherein in the first state, the feed conveyor assembly adopts a relatively lowered position with respect to the base.

10. An apparatus as claimed in claim 1, wherein in the second state, the feed conveyor adopts a relatively raised position with respect to the base.

11. An apparatus as claimed in claim 10, including a feed conveyor assembly comprising said feed conveyor and a support structure for the feed conveyor, said feed conveyor assembly being movable between said first and second states and wherein said feed conveyor is movable with respect to said support structure between an advanced state and a retracted state, wherein in the second state, the feed conveyor assembly adopts a relatively raised position with respect to the base.

12. An apparatus as claimed in claim 1, wherein said feed conveyor is coupled to said base by a pivotable linkage mechanism configured to move said feed conveyor between said first and second states.

13. An apparatus as claimed in claim 12 including a feed conveyor assembly comprising said feed conveyor and a support structure for the feed conveyor, said feed conveyor assembly being movable between said first and second states and wherein said feed conveyor is movable with respect to said support structure between an advanced state and a retracted state, wherein said feed conveyor assembly is coupled to said base by a pivotable linkage mechanism.

14. An apparatus as claimed in claim 1, wherein said screening unit is coupled to said base by a pivotable linkage mechanism configured to move said screening unit between said stowed and deployed states.

15. An apparatus as claimed in claim 12, wherein the respective pivotable linkage mechanism is power-operable, conveniently by one or more powered actuators.

16. An apparatus as claimed in claim 2, wherein said feed conveyor is slidably coupled to said support structure.

17. An apparatus as claimed in claim 2, wherein one or more power-operable acutators are provided for moving said feed conveyor between said advanced and retracted states.

18. An apparatus as claimed in claim 2, wherein said screening unit comprises a material screening unit, and wherein when said feed conveyor is in said second state and said material screening unit is in said deployed state, said material screening unit is located between, with respect to said direction, said feed conveyor and said first material processing unit, and said feed conveyor is positioned to feed material to said material screening unit.

19. An apparatus as claimed in claim 18, wherein said screening unit comprises a screen through which material may pass depending on its size, wherein when said screening unit is in the deployed state, said screen is positioned such that in use material that does not pass through said screen is discharged to said first material processing unit.

20. An apparatus as claimed in claim 19, wherein when said screening unit is in the deployed state, said screen is inclined downwardly towards said first material processing unit in a direction from said feed conveyor to said first material processing unit.

21. An apparatus as claimed in claim 19, wherein said screening unit comprises an outlet for material that passes through said screen during use, said outlet being aligned with a conveyor and/or a chute.

22. An apparatus as claimed in claim 1, wherein said first material processing unit comprises a crusher.

23. An apparatus as claimed in claim 1, wherein said apparatus is mobile, said base comprising a chassis having one or more wheels and/or tracks.

* * * * *